US009777708B2

(12) United States Patent
Risager et al.

(10) Patent No.: US 9,777,708 B2
(45) Date of Patent: Oct. 3, 2017

(54) CONTROL METHOD FOR A WIND TURBINE

(75) Inventors: Lars Risager, Ry (DK); Søren Dalsgaard, Hadsten (DK); Jacob Krogh Kristoffersen, Viby J (DK); Jesper Sandberg Thomsen, Hadsten (DK); Søren Sørensen, Aarhus N (DK); Asger Svenning Andersen, Steinen (DE)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 1005 days.

(21) Appl. No.: 13/995,449

(22) PCT Filed: Dec. 15, 2011

(86) PCT No.: PCT/DK2011/050484

§ 371 (c)(1), (2), (4) Date: Feb. 4, 2014

(87) PCT Pub. No.: WO2012/083958

PCT Pub. Date: Jun. 28, 2012

(65) Prior Publication Data

US 2014/0178197 A1 Jun. 26, 2014

Related U.S. Application Data

(60) Provisional application No. 61/425,585, filed on Dec. 21, 2010.

(30) Foreign Application Priority Data

Dec. 21, 2010 (DK) ................................ 2010 70568

(51) Int. Cl.
*F03D 7/02* (2006.01)
*F03D 7/04* (2006.01)

(52) U.S. Cl.
CPC ........... *F03D 7/0224* (2013.01); *F03D 7/024* (2013.01); *F03D 7/042* (2013.01);
(Continued)

(58) Field of Classification Search
CPC ......... F03D 7/0224; F03D 7/024; F03D 7/042
See application file for complete search history.

(56) References Cited

U.S. PATENT DOCUMENTS

| | | |
|---|---|---|
| 4,201,514 A | 5/1980 | Huetter |
| 2007/0018457 A1 | 1/2007 | Llorente Gonzalez |

(Continued)

FOREIGN PATENT DOCUMENTS

| | | |
|---|---|---|
| DE | 19731918 A1 | 1/1999 |
| EP | 1666723 A1 | 6/2006 |

(Continued)

OTHER PUBLICATIONS

International Search Report, PCT/DK2011/050484, Jun. 13, 2012.

(Continued)

*Primary Examiner* — Christopher Besler

(74) *Attorney, Agent, or Firm* — Patterson + Sheridan, LLP

(57) ABSTRACT

A method of controlling a wind turbine comprising blades attached to a rotor hub for rotation in a rotor plane and a control system for individually pitching the blades relative to the hub. The method comprises dividing the rotor plane into a number of sectors, determining the individual sectors for each blade during the rotation by means of an azimuth angle sensor, and obtaining blade sensor data from a blade sensor on an individual blade relating to a sector, and comparing the obtained data with data relating to the same sector and representing blade sensor data on other blades. When an event is detected in a given sector, an individual pitch contribution is determined in the sector, and the blades are then pitched according to this individual pitch contribution for that given sector at least partly during passage of the sector.

23 Claims, 8 Drawing Sheets

100
102, B
(101, 2)
(101, 3)
102, C
[180°]
[90°]
[270°]
[0°]
Sector 4
Sector 3
Sector 2
Sector 1
101
104
102, A
(101, 1)
105

(52) U.S. Cl.
CPC ... *F05B 2270/326* (2013.01); *F05B 2270/331* (2013.01); *Y02E 10/723* (2013.01)

(56) References Cited

U.S. PATENT DOCUMENTS

| | | | | |
|---|---|---|---|---|
| 2007/0041837 | A1* | 2/2007 | Ide | F03D 7/0224 416/147 |
| 2010/0092292 | A1* | 4/2010 | Nies | F03D 7/0224 416/41 |

FOREIGN PATENT DOCUMENTS

| | | | |
|---|---|---|---|
| EP | 2075462 | A2 | 7/2009 |
| EP | 2148088 | A1 | 1/2010 |
| WO | 2007/104306 | A1 | 9/2007 |

OTHER PUBLICATIONS

Danish Search Report, PA 2010 70568, Aug. 5, 2011.
Bossanyi, E.A."Individual Blade Pitch Control for Load Reduction," Wind Energy, Wiley, Chichester, GB, vol. 6, Oct. 8, 2002 (Oct. 8, 2002), pp. 119-128, ISSN 1099-1824.

* cited by examiner

CONTROL METHOD FOR A WIND TURBINE

The present invention relates to a method of controlling a wind turbine comprising blades attached to a rotor hub for rotation in a rotor plane and a control system for individually pitching the blades relative to the hub with the aim of reducing the risk of single or successive extreme loads on the blades, tower or other wind turbine components caused by wind gusts.

BACKGROUND

Most modern wind turbines are controlled and regulated continuously most often with the purpose of ensuring maximum power extraction from the wind under the current wind, and weather, while at the same time ensuring that the loads on the different components of the wind turbine are at any time kept within acceptable limits. Desirably, the wind turbine may also be controlled to account for fast sudden changes in the wind velocity—the so-called wind gusts, and take into account the dynamic changes in the loads on the individual blades due to e.g. the passing of the tower, or the actual wind velocity varying with the distance to the ground (the wind profile or shear).

To this purpose a number of parameters are collected and monitored by the controllers in a wind turbine, such as for instance the current wind speed and direction, the rotational speed of the rotor, the pitch angle of each blade, the yaw angle, information on the grid system, and measured parameters (e.g. stresses or vibrations) from sensors placed e.g. on the blades, the nacelle, or on the tower.

Based on these and following some control strategy the optimal control parameters of the turbine in order to perform optimally under the given conditions are determined. The current performance, and thereby the power production and the load situation of the wind turbine is primarily controlled by controlling the pitch angles of the blades, but may further include adjusting for instance any different active aerodynamic devices for changing the aerodynamic surfaces of the blades such as flaps or vortex generating means, adjusting the power, and/or adjusting the rotational speed of the rotor.

Wind turbines are traditionally constructed and controlled according to standards and according to wind maps and incorporating the trade-off of maximizing the annual energy production by the wind turbine while on the same time ensuring a certain life time of the turbine i.e. keeping the loads on the different components of the wind turbine within acceptable limits at all times and over time. Wind turbines are therefore typically designed according to a certain (high) turbulence but will most often be operating at a lower turbulence level and may in some conditions be controlled too conservative, while in some conditions not conservative enough resulting in undesired fatigue or extreme loads on the wind turbine components, especially the blades, nacelle and tower.

SUMMARY OF THE INVENTION

It is therefore an object of embodiments of the present invention to provide a control method for a wind turbine which obviate or reduce some of the above mentioned problems in known controlling methods.

It is a further object of the invention is to provide a control method for reducing the risk of single or successive extreme loads on the blades, tower or other wind turbine components caused by wind gusts. A further object of the invention is to provide a control method for ensuring that the loads on the turbine are kept within acceptable limits in all wind conditions while at the same time maintaining a high energy production of the wind turbine.

It is a further object of the invention to provide a control method which in a simple and effective way may react fast and reliable to changes in the wind load conditions.

It is a further object of embodiments of the invention to provide a wind turbine with a control system which effectively may react to events such as wind gusts also acting on only parts of the rotor plane.

In accordance with the invention this is obtained by a method of controlling a wind turbine comprising blades attached to a rotor hub for rotation in a rotor plane and a control system for individually pitching the blades relative to the hub, the method comprising the steps of dividing the rotor plane into a number of sectors, determining the individual sectors for each blade during the rotation by means of an azimuth angle sensor, obtaining sensor data from a blade sensor on an individual blade on an individual blade at least partly during a passage of a sector during the rotation, comparing the obtained data with data representing blade sensor data on the same or another blade at least partly during an earlier passage of the same sector during the rotation, thereby detecting an event for individual sectors of the rotor plane, determining an individual pitch contribution for a given sector only when an event is detected in said sector, and pitching the blades according to the individual pitch contribution for the given sector at least partly during passage of the sector.

According to an embodiment, the sensor data may comprise blade load data from a blade load sensor and/or blade stall data from a blade stall sensor.

Hereby is obtained a method for detecting and determining an event even if the event does not occur over the entire rotor plane but in a part of the rotor plane. Such events may comprise the occurrence of dynamic or sudden changes in the wind acting on the rotor plane and wind gusts, which in general may lead to corresponding sudden changes in the loads on the wind turbine, and especially on the blades and the tower.

According to an embodiment of the invention, the event detection in the method of controlling a wind turbine further comprises the step of calculating for the individual sectors of the rotor plane a deviation from defined normal operating condition from the obtained blade load data relating to the individual sectors.

The defined normal operation condition may be expressed in terms of a predefined maximal allowable structural condition of the blade such as e.g. blade load, moment, deflection, stall, or fatigue, or in terms of a predefined maximal acceptable kinetic energy of a blade for a rotor sector. These allowable or acceptable limits may be the same for all rotor sectors or may vary from sector to sector reflecting special circumstances such as e.g. be lower in the sectors near the tower or in the sectors covering the uppermost part of the rotor plane where the wind may generally attain the highest velocities. This can be used to detect wind events in arbitrary sectors of the rotor plane. As an example, if a certain part of the rotor plane is known to be critical, this can be accounted for. The defined normal operation condition may further vary as a function of different operational parameters, such as for example as a function of the mean wind velocity or a general turbulence factor. In this way, the control method may for instance set the conditions for normal operation lower during high wind loads making the control method more sensitive. Further, the defined normal operation may be a function of more than one structural condition of the blade such as e.g. a combination of blade load and blade angle of attack.

By comparing blade sensor data such as blade loads as measured in one rotor sector to previously measured blade sensor data in the same sector, the control method may be able to detect and hence react to sudden changes in the blade condition for each rotor sector and thereby detect events such as wind gusts or other dynamic changes in the wind acting across the rotor plane. Hereby is further obtained a control method which may detect and react to more complex wind fields and wind patterns varying over the rotor plane. The proposed control method may in this way detect and take into account wind shear effects and dynamic effects such as extreme wind changes and both full and partial rotor wind gusts.

The obtained blade loads relating to a sector may be compared to blade sensor data (such as loads) obtained previously from measurements on the same blade or from measurements on another wind turbine blade. In this way, the method may be performed on a wind turbine using sensor measurements from a single blade comparing data from one rotation to the next, or may additionally or alternatively be performed by use of blade sensors on a number or all of the turbine blades. By the latter may be obtained blade sensor data intervals relating to a given sector at shorter time intervals and thereby more detailed information, and higher probability of detecting and reacting to an event.

Because of the more complex and complete information obtained on the dynamic wind loading acting across the rotor plane, the control method may accordingly react faster and more precisely to the sensed and detected event. By taking these partial or full dynamic wind events into account in the controlling of the wind turbine may be achieved, that the extreme loads on the wind turbine or in any parts or components of the wind turbine may be reduced considerably during operation without or with only minor reductions in the overall power production. For example the extreme turbine blade loads such as the blade flap or edge loads, blade flap moments, or blade fatigue may in this way be reduced. Likewise, extreme tilt loads or moments, yaw loads or moments, loads on the tower, or nacelle, or other wind turbine components such as on the bearings, shaft or the like may be reduced during such events.

The blade load data considered comprise especially load data measured on the turbine blade such as blade flap or edge loads, or blade flap moments. Alternatively or additionally, the load data may comprise or represent fatigue loads on the turbine blades. The blade load data may be obtained by one or more sensors placed in the wind turbine blades such as e.g. in the blade root or further out in the blade shell. The sensor may comprise for instance strain gauge sensors, optical sensors, or the like. Additionally or alternatively, the blade sensor may comprise stall sensors, accelerometers, and/or deflection sensors.

The rotor plane may be divided into a number of sections of even or uneven size, i.e. of equal or different size. As an example, the rotor plane may be divided into sectors of 5-30 degrees, such as 5-20 degrees such as around 10 degrees. The rotor plane may likewise be divided into a factor times the number of blades of equal sized sectors such as e.g. 12 sectors of 30 degrees each. For each turbine blade, one or more pitch azimuth angle sensors detect in which rotor sector the blade currently travels. In this way the blade loads sensed on each blade may be related to the rotor sector in which the loading occurs and thereby linked to the wind loading and wind flow in that rotor sector.

By dividing the rotor plane into sectors and relating the blade sensor data such as the blade loads to the rotor sectors, the proposed control method advantageously exploits the fact that the blades are rotating; i.e. the information from a leading blade travelling through a sector is used in the detection of an event occurring later in the same sector. That is, the control method introduces memory into the system which decreases the risk of successive extreme loads.

According to an embodiment of the invention, the method of controlling a wind turbine further comprises the step of comparing an instantaneous blade sensor data relating to a sector to a load threshold, the load threshold being a function of the mean blade sensor data and a number of standard deviations. The hereby obtained load threshold varies as function of the measured blade sensor data over time for that specific sector. Hereby is obtained, that the control method may detect and handle high dynamic wind events since the detector in contrary to traditional control methods takes into account an estimate of the standard deviation. The number of standard deviations used in determining the load threshold may be a predefined constant such as e.g. a factor between 1 and 6, or 2 and 4, such as 3). In a further embodiment, this number of standard deviations may vary over time, or from one sector to another, and in dependence of wind turbine parameters such as e.g. the mean blade load, the rotational speed, the actual blade pitch angle, the mean wind velocity or the like. In this way the control method may be tuned to be more or less sensitive in direct dependency of these conditions. The number of standard deviations used may be predetermined based on post processing of computer simulations on acceptable blade loads.

The mean blade sensor data and the standard deviation of the blade sensor data may be determined by a linear averaging over previous of blade loads values or may be determined by exponential averaging or the like. Exponential averaging may be advantageous in that the mean and standard deviation may then be obtained by updating the previously determined values from one sample to the next with minimal memory requirements.

According to an embodiment of the invention, the method further comprises the detection of the spatial orientation of the wind turbine, and the event detection comprises the step of comparing an instantaneous blade sensor data relating to a sector to a load threshold, the load threshold being a function of the spatial position. Hereby, the wind turbine may be protected from extreme loads whenever the turbine is in a critical yaw sector, i.e. is oriented in a specific direction. In this way the load threshold could be adjusted in dependence on the spatial orientation (NESW) orientation of the wind turbine thereby potentially taking into account knowledge of for these spatial orientations such as typical wind or weather conditions and/or site-given conditions. Such knowledge could optionally be obtained by letting the threshold be history based as for instance being computed or adjusted from the history of the input signals from the specific orientation, or be obtained from otherwise obtained site data. In this way, a more conservative pitch regulation could be applied and the turbine could have a higher tendency to derate in situations where the wind turbine is oriented in directions with a higher risk of being critical. Hereby the risk of overloading the turbine is further reduced. As an example, if the wind turbine is placed on the top of a brink, the control method according to the invention could set a higher pitch contribution for the lowermost rotor sectors when the turbine is turned with the wind coming up the brink.

According to an embodiment of the invention, the method further comprises reducing the load threshold of a first sector by a factor, when the instantaneous blade load exceeds the load threshold in a second sector, the second sector being less than a predefined number of sectors away from said first sector. In this way the detection of an event in one sector may be used to decrease the load thresholds and thereby increase the sensitivity of the method in the sectors next to or near to the sector of the event detection. The factor may be some predefined constant in the range of 0.7-0.99, for example between 0.85 and 0.95. The threshold reduction may be performed to all sectors within for instance 120 or 180° to the sector of event detection, or additionally or alternatively to a number of sectors preceding or following the sector of event detection. The number of sectors affected may be a predefined number such as for instance 2 or 4 or may be a number increasing with severity of the detected event. By the proposed threshold reduction may be obtained that if an event is detected as a a blade leaves a sector, the event detection is already expected to possibly occur for the following blade and the threshold reduction may then cause the following blade to be pitched out a little sooner than would otherwise be the case.

According to an embodiment of the invention, the above mentioned calculation comprises the step of comparing an instantaneous blade load relating to a sector to a maximum load threshold reflecting a predetermined maximally acceptable blade load. Hereby is set an upper absolute safety limit of the instantaneous blade load above which an event is detected regardless of other parameters such as the mean blade load, whereby it may be ensured that the control method will react to such high blade loads. Hereby the risk of missing an event detection may be reduced.

In a further embodiment the above mentioned calculation comprises the step of comparing an instantaneous kinetic energy derived from the blade load relating to a sector to a kinetic energy threshold, the kinetic energy threshold being a function of the mean blade kinetic energy and a number of standard deviations. By using such kinetic energy threshold in the detection of events in the individual rotor sectors, the detection time under some types of dynamic wind events may be reduces considerably, i.e. the event may detected and thereby reacted to earlier than the case for the detection being based on the blade loads only.

The kinetic energy on a blade relating to a given sector may be determined from the measured blade loads and e.g. estimated as a constant parameter times the time derivative of the blade load squared. The reasoning behind this correlation is the correlation between a blade flap moment (or load) and strain in a rotor section. These are linearly dependent and as the kinetic energy can be found from the derivative of strain, the kinetic energy can be found from the derivative of blade flap moment.

Alternatively or additionally, the blade kinetic energy may be estimated from deflections, accelerations, or angular displacement of the blade.

According to a further embodiment of the invention, the individual pitch contribution may be determined such as to affect an individual blade to pitch out of the wind when an event is detected in a given sector. In an embodiment of the invention, the individual pitch contribution is added to a collective pitch reference providing a common pitch for all blades.

Thus, when an event is detected in a given sector an individual pitch contribution is added to the collective pitch reference so as to force the individual blade to pitch out of the wind at least when passing through a part of the critical sector and subsequently reduce the risk of extreme blade loading. In this way the blades are additionally pitched when passing such critical sectors where a wind event is detected by the same or an earlier blade. Hereby, the risk of extreme loads decreases as the control method adapts the individual pitch contribution in the different sectors. The main functionality of the control method is accordingly to use blade sensors such as absolute flap root bending moment sensors to detect critical blade loads and react by individually pitching the blades out of the wind.

An individual pitch contribution may be maintained for each rotor plane sector depending on an event detection such that a pitch contribution is added for those sections only where an event is detected. The individual pitch contribution may comprise a pre-defined constant value such as e.g. an angle between 2-10 degrees, for example 5 degrees. Further, the same pitch contribution may be added to any blade passing through the relevant event sector. Alternatively or additionally the individual pitch contribution may be adapted or decrease or in any other way vary as a function of parameters such as time, the value of the actual measured blade load, the actual value of the blade pitch etc.

In an embodiment of the invention, the individual blade is pitched according to the individual pitch contribution while the blade passes through said given sector, where the event is detected. Alternatively, the pitch contribution may be reduced or set to zero in case the measured blade load or blade kinetic energy relating to the sector decreases below a certain threshold or otherwise determined to be in control.

Alternatively or additionally, the pitch contribution may be determined as a function of the position of the blade within the given sector. In this way the rotor sector could optionally be divided into a number of pitch sectors with different pitch contributions, and the blade could be pitched accordingly when passing through the different pitch sectors within the rotor sector. In this way a more refined actuation scheme could be employed while maintaining the coarser sensor sectors. A coarser sensor grid corresponding to larger rotor sectors may be advantageous in reducing the noise from the sensors. Further, finer rotor sectors may not be needed as the blade sensor data do not necessarily change as fast during the rotation. On the other hand, a finer actuation grid and smaller pitch sectors may be advantageous in providing a more smooth pitch and thereby a more smooth adaption to the changing conditions during a rotation.

In a further embodiment of the invention, the individual blade is pitched according to the individual pitch contribution until the instantaneous blade load relating to said given sector is decreasing, or is decreased by a load factor relative to a maximum blade load obtained after the detection of the event. In this way the individual blade pitching caused by the event is stopped when the blade loads may be considered as being under control again. By first stopping the additional pitching when the blade load is decreased by a load factor relative to the most recent maximum blade load, the blade load is to a higher a degree of certainty under control. As an example the event may be considered over when the blade load has decreased to e.g. 80 or 90% of the maximum load.

Alternatively, the individual pitch could be maintained for instance as long as the instantaneous blade load exceeds the load threshold.

In a further embodiment of the invention, the individual pitch contribution is a function of the rotational speed of the rotor. In this way the individual pitch contribution may be reduced as a function of time—for example as an exponentially decaying function so that the pitch contribution for a new blade entering the event sector is determined in dependence of how long time has passed since the last blade was passing through the event sector.

According to a further embodiment of the invention, the individual blade pitching is initiated at an angular compensation distance prior to the blade entering the given sector. In this way the method may compensate for the delay which may be present in a pitch actuation system, otherwise causing pitch angles only to be fully effectuated after some time. The angular compensation distance may be chosen in correspondence to the delay factor of the pitch actuation system and the rotational speed of the rotor. In this way may be achieved that the blade is actually pitched according to the decided individual blade pitching already upon entry in the given sector where the event has previously been determined.

In yet a further embodiment of the invention, the control system comprises memory adapted for data relating to the obtained blade sensor data, and the method comprises determining a required pitch contribution of a lagging blade from data from sensors on a leading blade.

In this way, the proposed control method reduces the risk of not only an extreme blade load due to a wind event in some rotor sector, but also reduces the risk of extreme blade loads occurring successively as a new blade enters a sector affected by a wind event. In other words the proposed control method combines an event detection algorithm with an event pitch learning algorithm in that the former event detection algorithm detects wind events such as gusts which appear in arbitrary sectors of the rotor plane and the latter pitch learning algorithm encapsulates this information to adapt the blade pitch angle in these sectors accordingly also for the blades to come.

By dividing the rotor plane into sectors and relating the blade loads to the rotor sectors, the proposed control method advantageously exploits the fact that the blades are rotating; i.e. the information from the leading blade load sensors are used to predict the required pitch contribution of the lagging blades optimally to avoid extreme blade loads or alternatively to reduce the risk of extreme blade loads. That is, the algorithm introduces memory into the system which decreases the risk of successive extreme loads.

According to an embodiment, the individual pitch contribution may be determined as a function of the gradient of the blade sensor data. Hereby, the pitch contribution may be determined such as to reflect more closely the kinetic energy present when entering a sector for which event has been detected. In this way the pitch contribution may be reduced in case the gradient of the measured blade sensor data is limited thereby avoiding too extreme pitching when not needed. Correspondingly, the pitch contribution may be increased in case of relatively large gradients of the measured blade sensor data.

According to an embodiment, the individual pitch contribution is adjusted as a function of the difference between the sector load threshold and the measured blade load. This may be obtained by applying a P-, PI-, and/or PID-controller where the update or correction of the pitch reference is performed continuously by comparing the measured blade sensor data with the expected blade sensor data based on information from the last blade in that sector. In this way the sector pitch reference contribution may be modified significantly if the difference between the sector load threshold and the actual blade sensor data is large and low if the difference is low. Hereby, may be obtained a more gradual reduction of the blade sector pitch contribution based on the physical and actual circumstances.

A further aspect of the invention is obtained by a wind turbine comprising blades attached to a rotor hub for rotation in a rotor plane and a control system for pitching the blades relative to the hub, where the control system, for individual sectors of the rotor plane determined by means of an azimuth angle sensor, can detect an event by obtaining blade sensor data relating to a sector from a blade sensor on an individual blade at least partly during passage of the sector during the rotation, and comparing the obtained data with data relating to the same sector and representing blade sensor data on the same or another blade at least partly during an earlier passage of the same sector during rotation, and determine an individual pitch contribution for a given sector only when an event is detected in said sector, the wind turbine further comprising a pitch system individually pitching the blades according the individual pitch contribution for the given sector at least partly during blade passage of the sector.

The sensor data may comprise blade load data from a blade load sensor.

The control system of the wind turbine may further be configured to perform the control method according to the previously described.

In an embodiment of the invention the control system comprises memory adapted for data from load sensors on a leading blade, the control system being capable of determining a required pitch contribution of a lagging blade from the data in the memory.

The advantages of the above described wind turbine and wind turbine control system are as described above in relation to the method of controlling a wind turbine.

In an embodiment, each blade of the wind turbine comprises a blade load sensor placed at the same distance to the hub. Hereby is ensured that data from one blade may be directly comparable to data measured by another blade. In this way the data obtained from the blade load sensors relate to wind events in the same position and is only primarily a function of the azimuth angle position of the blade and the time.

In a further embodiment, a blade comprises a number of blade sensors placed at different distances to the hub, thereby defining a number of sub sectors to each individual sector of the rotor plane, and wherein the control system for each individual sub sector can detect an event by obtaining blade load data relating to said sub sector. Hereby events may be detected relating to each sub sector. In this way a more fine subdivision of the rotor plane may be obtained and thereby a control method capable of reacting to finer or more local event. Also, in this way, local events may to a greater certainty be detected in that data measurements are obtained at more positions in the rotor plane.

According to yet a further aspect the present invention relates to a control system for individually pitching turbine blades relative to a hub of a wind turbine, the blades being attached to the rotor hub for rotation in a rotor plane, and where the control system, for individual sectors of the rotor plane determined by means of an azimuth angle sensor, can detect an event by obtaining blade sensor data relating to a sector and from a blade sensor on an individual blade at least partly during a passage of the sector during the rotation, and comparing the obtained data with data relating to the same sector and representing blade sensor data on the same or another blade at least partly during an earlier passage of the same sector during the rotation, and determine an individual pitch contribution for a given sector only when an event is detected in said sector, the control system further setting the blade pitch command according the individual pitch contribution for the given sector at least partly during blade passage of the sector.

The advantages of the wind turbine control system are as described above in relation to the method of controlling a wind turbine.

BRIEF DESCRIPTION OF THE DRAWINGS

In the following different embodiments of the invention will be described with reference to the drawings, wherein.

DETAILED DESCRIPTION OF THE DRAWINGS

Figure 1:
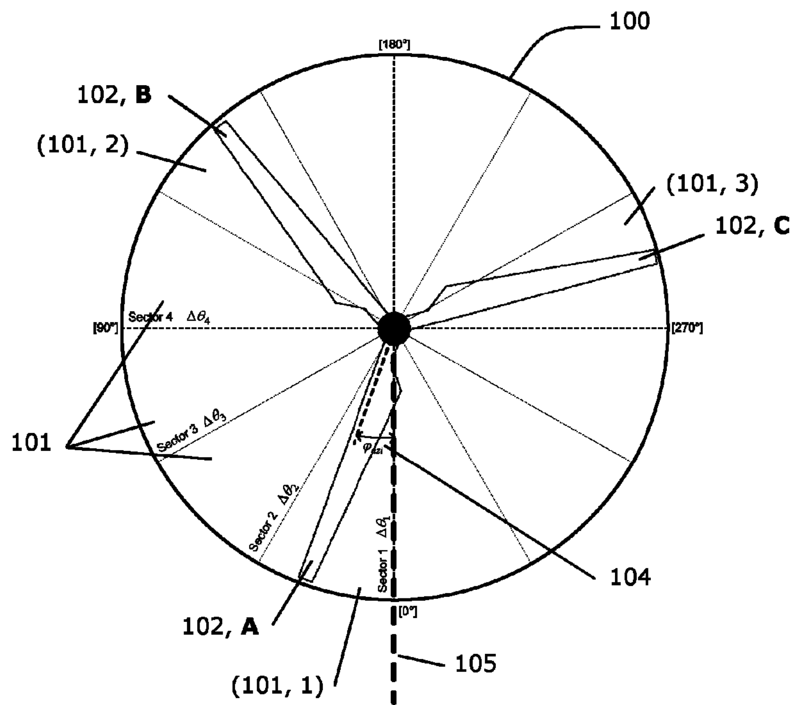
FIG. 1 is a sketch of the rotor plane divided into individual rotor sectors.

FIG. 1 illustrates method step of dividing the rotor plane 100 of a wind turbine into a number of sectors 101 according to an embodiment of the proposed wind turbine control method.

In this example, the rotor plane 100 is divided into 12 equally sized rotor sectors 101. The rotor blades 102 denominated A, B, and C are outlined in a position where the rotor blade A is in the first sector (101,1), the rotor blade B is in sector 5 (101,2), and the third rotor blade C is in sector number 8 (101,3). The vertical line 105 illustrate the tower axis of the wind turbine In order to reduce the risk of inducing tilt/yaw moments by the individual pitch control method according to the invention, the number of sectors may advantageously be set according to the following rule thereby ensuring that all blades change sector synchronously:

$$\left(\frac{N_s}{3}\right) \in Z^+$$

Where $N_S$ is the number of rotor sectors 101. The azimuth sensor measuring the azimuth angle 104 of one or more blades 101 may be used to determine the sectors which contain a blade at a given time. In this way a vector S comprising as its elements the numbers of the sectors comprising a rotor blade, may be determined from the sector boundary angles defined by:

$$\varphi_{s,start} = (s-1)\frac{360}{N_s}$$

$$\varphi_{s,stop} = s\frac{360}{N_s}$$

$$s = 1, 2, \ldots, N_s$$

That is, for e.g. $N_S$=12, sector 2 is defined for azimuth angles in the interval [30°; 60°].

Figure 2:
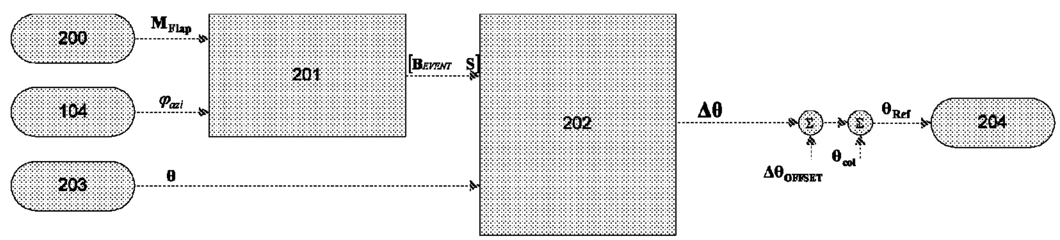
FIG. 2 illustrates a concept for the control method according to the invention.

FIG. 2 illustrates the outline of the control method. Here and in the following the control method according to the present invention is described and exemplified by the use of blade loads as measured by blade load sensors. However, the wind events for each sector and control methods described in the following may likewise additionally or alternatively be based on other input signals reflecting a structural or environmental condition of the blade such as stall sensors, blade accelerometers, wind velocity sensors, blade deflection sensors, angle of attack sensors, blade strain gauges or the like.

Based upon the measurements from the blade load sensors 200 and the azimuth angle 104 measured by the azimuth angle sensor, an Event Detector 201 detects if and in which rotor sector 101 and at what rotor azimuth angle, one of the blades 102 experiences a wind event. This information in contained in the event vector $B_{event}$ signalling whether an event is detected in the sectors S. The output from the Event Detector is subsequently used with the measurements from pitch position sensors 203 measuring the actual pitch of each blade θ, and optional rotor speed sensor in a pitch learning algorithm 202 to estimate an additional individual pitch reference offset Δθ for the blades subjected to the wind event. Finally, these individual pitch reference offsets are added to the collective pitch reference $\theta_{col}$ in a pitch control system and optionally in combination with other individual pitch offsets and resulting a final blade pitch reference $\theta_{Ref}$, 204 for each blade.

A detected event may further trigger the following action: A maximum pitch system valve reference request is sent to a pitch control system in order to obtain maximum pitch rate. This should saturate the control voltage of the pitch system of the blade on which an event is detected to maximum.

In an embodiment of the invention, the individual pitch reference offsets are added to the collective pitch reference during event detections although the pitch system control voltage is saturated to maximum simultaneously. This may be performed to enable a smooth or more even transfer of the pitch when the wind event stops, and the pitch system control voltage is no longer saturated to maximum any more.

By the combination of the event detection algorithm 201 and the event pitch learning algorithm 202 the risk of extreme blade flap/tilt/yaw loads during extreme wind gusts may be reduced considerably, in that the former detection algorithm 201 detects wind gusts which appear in arbitrary parts of the rotor plane while the latter pitch learning algorithm 202 encapsulates this information to adapt the individual pitch angles θ of the following blades accordingly.

For each sector in the rotor plane the mean $\mu_M$ and standard deviation $\sigma_M$ of the flap moment are estimated and updated each time a blade passes through a sector. These measures are used to estimate the expected flap moment load in the sectors.

Figure 3:
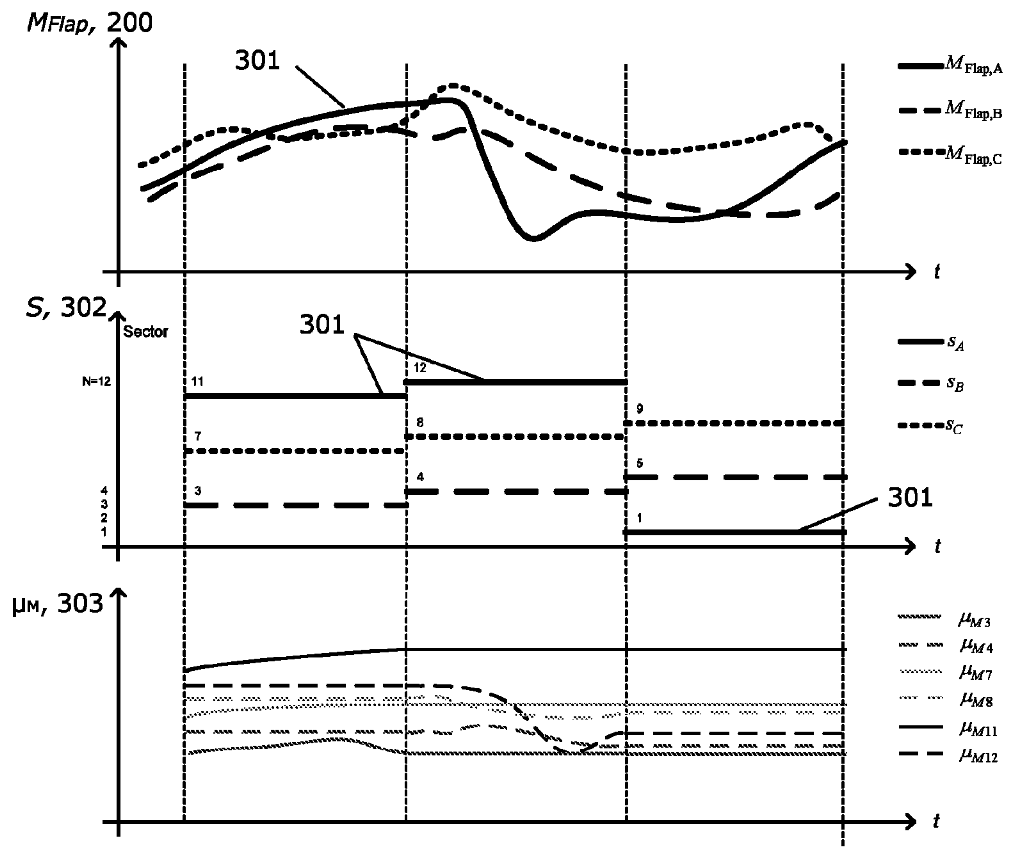
FIG. 3 is a sketch of the estimation of the blade loads and mean blade loads (the blade loads here determined as the blade flap moment) in selected rotor sections, FIG. 4 gives an overview of an embodiment of the event detector.

Estimation of the mean blade load $\mu_M$, 303 such as the mean blade flap moment in the selected sectors 101 of sector number 3, 4, 7, 8, 11, and 12, is illustrated in FIG. 3. The standard deviation of the blade load $\nu_M$ may be estimated similarly. The curves in the uppermost co-ordinate system show the blade load $M_{Flap}$, 200 as measured on each of the three turbine blades as a function of time t. In the middle of FIG. 3 is shown the sector vector S, i.e. which sector each of the blades pass through at a given time while measuring. For example, the curves for blade A are shown in solid black 301, and this blade passes first through sector number 11, enters sector 12 and thereafter sector number 1 and so forth. Similarly, blade B is shown in dashed lines, and blade C is shown in dotted lines. From these measurements may then be determined the mean $\mu_M$ and standard deviation $\sigma_M$ of the blade load for each rotor sector as illustrated in the lowermost curves in FIG. 3 showing the mean blade load over time for 6 different sectors. Not all sector values are shown due to clarity. The mean $\mu_M$ and standard deviation $\sigma_M$ of the blade load are estimated and updated each time a blade passes through a sector. In this way the mean value and the standard deviation relating to a rotor sector are only updated when the sector contains a blade. This gives an update rate of the expected loads of 3P. That is, the mean blade load in a given sector is computed from samples from all three turbine blades.

Estimation of $\mu_M$ (n) and $\sigma_M$ (n) in the different sectors may in an embodiment be done with exponential averaging as a function of the sample number n:

$$\mu_M(n) = \frac{T}{\tau_{Load}} M_{Flap}(n) + \left(1 - \frac{T}{\tau_{Load}}\right)\mu_M(n-1)$$

$$\psi_M(n) = \frac{T}{\tau_{Load}} M^2_{Flap}(n) + \left(1 - \frac{T}{\tau_{Load}}\right)\psi_M(n-1)$$

$$\sigma_M(n) = \sqrt{\psi_M(n) - \mu^2_M(n)},$$

where T is the sampling time, $\tau_{Load}$ is the time constant of the exponential averaging, and $\psi_M$ (n) is an intermediate variable used to compute $\sigma_M$ (n). Alternatively, mean value and standard deviation of the blade loads may be determined by more standard linearized mean and standard deviation expressions.

Further, as the flap moment in a section and the strain in the same section are correlated and are linearly dependent, and as the kinetic energy can be found from the time derivative of strain, the kinetic energy of each sector may by analogy be estimated from the derivative of the measured root bending flap moment $M_{Flap}$ as:

$$E = \left(k \frac{dM_{Flap}}{dt}\right)^2$$

where k is a conversion constant used to convert the time derivative of the flap moment to the blade kinetic energy depending e.g. on the stiffness of the turbine blade and may be estimated from simulations or tests. Alternatively or additionally, the blade kinetic energy may be estimated from deflections, accelerations, or angular displacement of the blade.

For each sector in the rotor plane, the mean value $\mu_{Es}$ and the standard deviation $\sigma_{Es}$ of the blade kinetic energy may therefore be estimated and updated each time a blade passes through a sector, and may be computed using the same approach as described above in relation to determining the mean value and the standard estimation of the blade loads.

The mean value and the standard estimation of the blade loads and optionally of the sector kinetic energy as well may be used in detecting whether a wind event has occurred in a given sector upon blade passage. An overview of an embodiment of the event detector algorithm is illustrated in FIG. 4.

Figure 4:
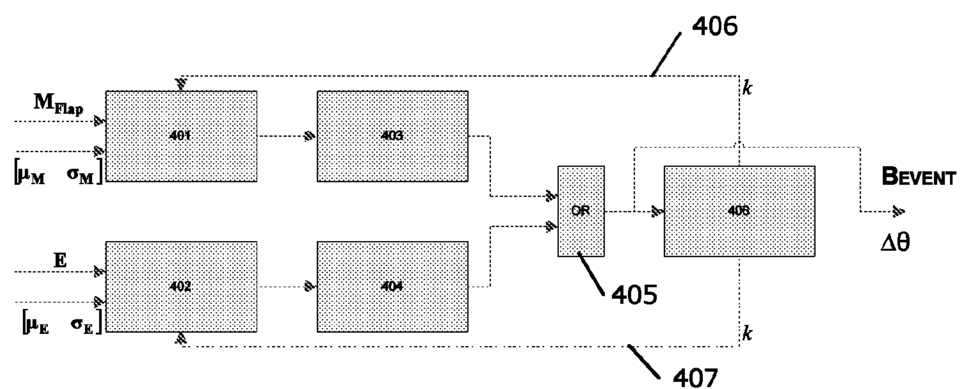

The event detector as sketched in FIG. 4 is based on both the root bending flap moment and the blade kinetic energy derived from the root bending flap moment. However, the event detector may likewise be based on the blade loads alone or alternatively on the blade kinetic energy alone, or on different combinations on the two parameters. The event detector may further take into account other parameters like local wind measurements in the event detection.

The individual pitch of a blade in a sector may be modified as long as an event is detected in that sector, and further for a certain amount of time after an event has occurred. In a given sector the initiation of an event detection may be set as a function on both the root bending flap moment and the blade kinetic energy derived from the root bending flap moment as determined in a blade load detector, 401, and in a kinetic energy detector 402. The motivation for a kinetic energy detector is to reduce the detection time in some dynamic wind events. The kinetic energy detector is identical to the flap moment detector except from the input signals. Whether a detected wind event is still active is then continuously evaluated from the thresholds as described in the following and optionally following an event detection time reduction scheme 403 (based on the blade loads) or optionally an event detection hold scheme 404 (based on the estimated kinetic energy), which in principle shortens or prolongs the duration of the detected wind event based on different criteria. This is described in more details in relation to the FIGS. 5 and 6. If a wind event is detected either 405 based on the blade loads $M_{FLAP}$ or the estimated kinetic energy E, the blade event vector $B_{EVENT}$ signalling whether an event is detected in the sectors comprising the blades is set accordingly, and an individual blade pitch contribution $\Delta\theta$ is determined and added to the blade pitch reference $\theta_{ref}$. Further, an event detected in one sector may affect the thresholds in the earlier sectors in this way preparing an incoming blade to the detected wind event. This is preformed in the blade threshold reduction scheme 406 where the threshold reduction factor k is determined influencing the load threshold 406 and optionally the kinetic energy threshold 407. This is described in more detail later.

In order to determine deviations from the expected loads in a given sector, the absolute blade load as measured $M_{Flap}$ is compared to one or more different load thresholds T. A threshold may generally be a fixed pre-defined constant or may be a function of measured or estimated parameters like the determined blade load mean and/or standard deviation. Sets of different thresholds may be used thereby detecting a wind event in a sector based on a set of conditions.

In an embodiment of the invention three different thresholds on the blade loads are applied:

$$T_1 = M_{Flap,Min}$$

$$T_2 = \mu_M + N_M(\mu_M)\sigma_M$$

$$T_3 = M_{Flap,Max}(\mu_M)$$

Here, the threshold $T_1$ is set as a constant minimum flap moment limit below which no wind event occurs regardless of the values of the other thresholds. The threshold $T_2$ is a function varying over time depending on the derived mean blade load and standard deviations. $N_M$ ($\mu_M$) is a number, which may be set as a pre-defined constant such as e.g. a factor between 1 and 6, or 2 and 4, such as 3), or may alternatively be determined as a parameter varying over time, from one sector to another, and in dependence of wind turbine parameters such as e.g. the mean blade load, the rotational speed, the actual blade pitch angle, the mean wind velocity or the like. In this way the control method may be tuned to be more or less sensitive in direct dependency of these conditions. The number of standard deviations used may be predetermined by post processing of computer simulations on acceptable blade loads. The third threshold $T_3$ is set as a maximum acceptable blade flap moment being a function of the mean blade load as found from simulations. This threshold covers especially situations at high mean blade loads, where there could otherwise be an increased risk of detecting an event too late. The function $T_3$ may thus be chosen as a linearly or exponentially decreasing function in $\mu_M$. The thresholds $T_2$ and $T_3$ may be kept constant as the blade passes through a sector, and updated when the blade exits the sector. Further, the thresholds may be derived from samples from the leading blades only or may be determined including the measurements made on the same blade as well. Further, a fourth threshold may be set $T_4$ as a maximum limit above which a wind event occurs regardless of the otherwise determined mean blade load:

$$T_4=M_{Flap,Alarm}.$$

The resulting threshold is augmented from three different thresholds as:

$$T_M=\max(T_1\ \min(T_2T_3))$$

Or in case the above mentioned absolute upper threshold is also applied:

$$T_M=\min(T_4\ \max(T_1\ \min(T_2T_3)))$$

In this way no event is detected when $|M_{Flap}|\leq T_M$ which is tested continuously when a blade passes through a sector. The motivation for the thresholds is to find a balance between two types of detection errors; one type error of false alarm where an event is detected without being the case, and one other type error where an event detection is missed. So the thresholds are set with the general purpose of on the one hand detecting an event as early as possible, while on the other hand detecting as little or as late as possible (preferably nothing at all) in the case no event actually takes place.

Similar threshold values and functions are set for the kinetic energy detector 402, and the detection of an event from the kinetic energy is identical to the above described flap moment detector except from the input signals.

Figure 5:
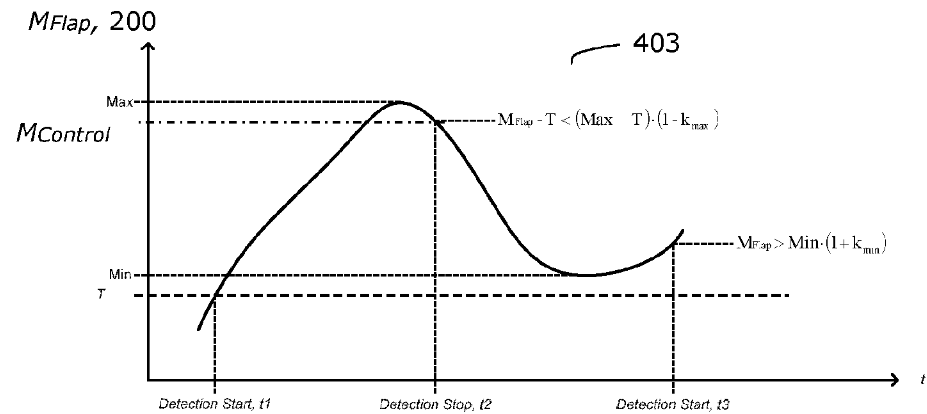
FIG. 5 illustrates the start and end of a wind event from a blade load measurement.

In order to reduce the influence of false alarms and to reduce the detection time an event detection time reduction scheme may be implemented. The concept of this is illustrated in FIG. 5. The wind event detection is initiated at t1 where the measured blade load $M_{Flap}$ exceeds the threshold T. From the figure it may be seen that the event detector will signal that the event has stopped at t2 when the measured blade flap moment is in control $M_{Flap}<M_{control}$, as determined by the blade load decreasing or as having decreased by a certain load factor $k_{max}$ as given by $M_{Flap}<M_{control}=\text{Max}-k_{max}(\text{Max}-T)$, as illustrated in the FIG. 5. The wind detection is in this way stopped earlier. Alternatively, the wind detection may be stopped when the measured blade load is again below the threshold.

According to a further embodiment, the detection may be set to start again at t3 if the flap moment slope changes from negative to positive over a certain amount of time as illustrated in the FIG. 5.

Figure 6:
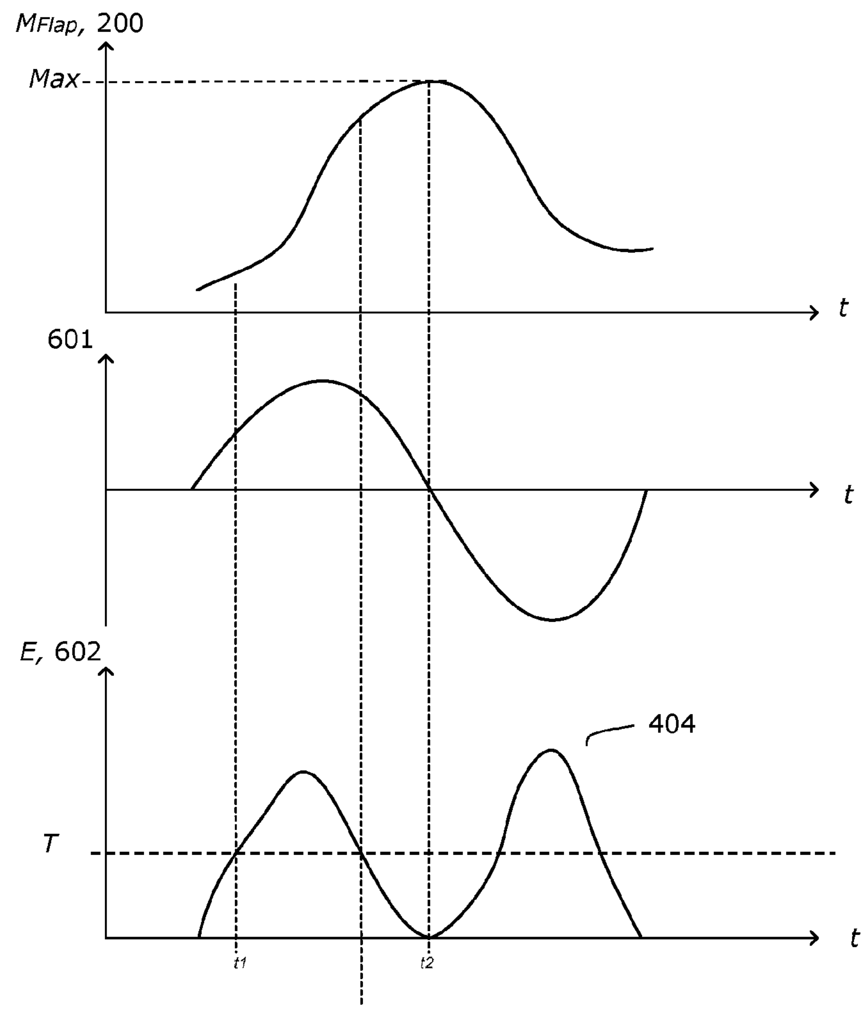
FIG. 6 illustrates the event detection based on blade loads and blade kinetic energy.

Further, if the kinetic energy detector only detects an event as long as the kinetic energy is above the kinetic energy threshold, the blade load may not yet be in control in all situations as the derivative of the blade load may decrease prior than the blade load has attained its maximum. This is illustrated in FIG. 6. The uppermost curve illustrates a measured blade load $M_{Flap}$ 200, the middle curve show the corresponding derivative hereof, ie the blade load rate of change, 601, and the lowermost curve illustrate the corresponding kinetic energy E 602 derived hereof, being proportional to the blade load rate of change squared. Therefore, an event detection hold scheme 404 may be implemented where the flag signalling an event to be active is kept until the flap moment rate of change changes sign from positive to negative at time t2.

Figure 11:
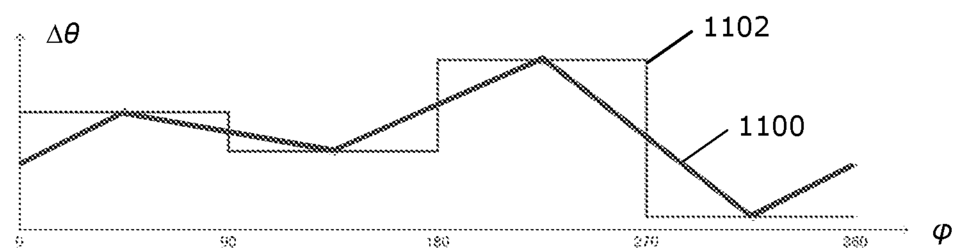
FIG. 11 illustrates the determination of a sector pitch contribution according to an embodiment of the invention by the smoothing of neighbouring sectors pitch contributions.

When an event is detected on one blade in a given sector, the blade may detect the event on its way out the sector(s) in which the event builds up, for instance if an event covers the sectors 2, 3, and 4 and is detected in sector 4. Hence, the lagging blade could benefit from the event information from the leading blade. This concept of a blade threshold reduction scheme 406 may be implemented as illustrated in FIG. 11.

Figure 7:
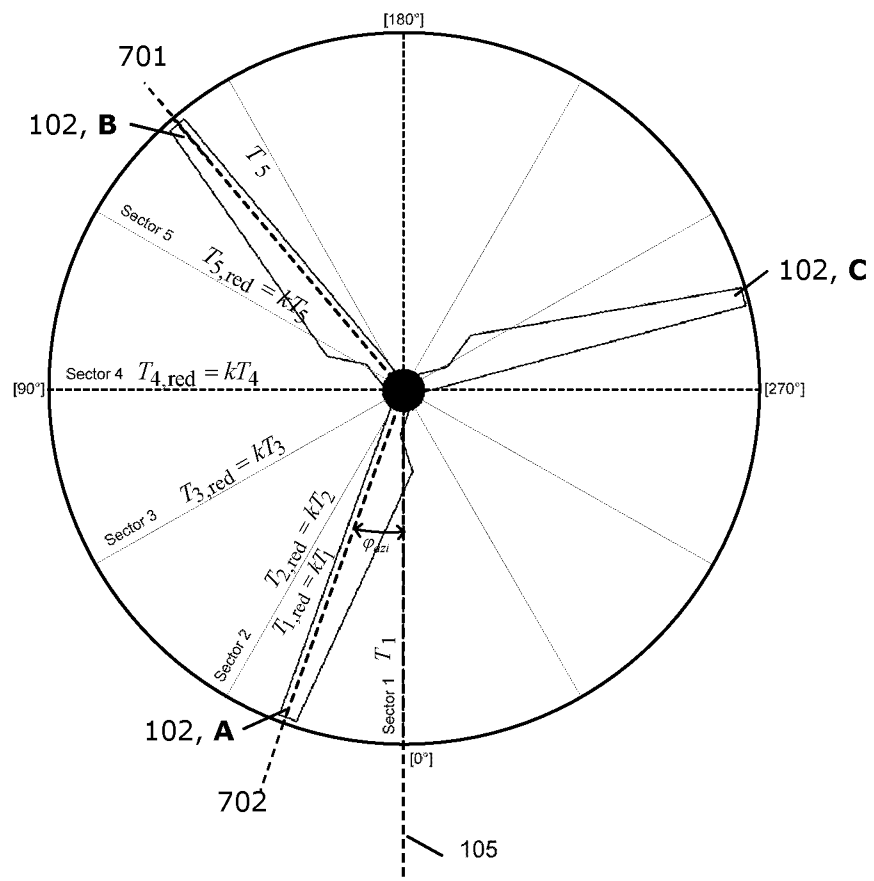
FIG. 7 illustrates the reduction of the sector load thresholds according to an embodiment of the invention.

From FIG. 7 it can be seen that when an event is detected 701 by blade B, 102, the threshold T seen by blade A is reduced 702 by a factor k until blade A reaches the azimuth position where the event was detected by blade B in the first place. That is, the detection of an event by blade B increases the sensitivity of detection for blade A. Both the flap moment and kinetic energy thresholds may be reduced by this blade threshold reduction scheme or either of these. The resulting reduced threshold T may then be determined as:

$$T_M=\min(T_4;\max(T_1;k\cdot\min(T_2;T_3)))$$

The factor k by which the thresholds are reduced may attain a predefined value such as in the range of [0.85-0.98] or may be determined as a function of e.g. the azimuth angle $\phi_{azi}$, and may be determined and fine tuned from numerical simulations.

Figure 8:
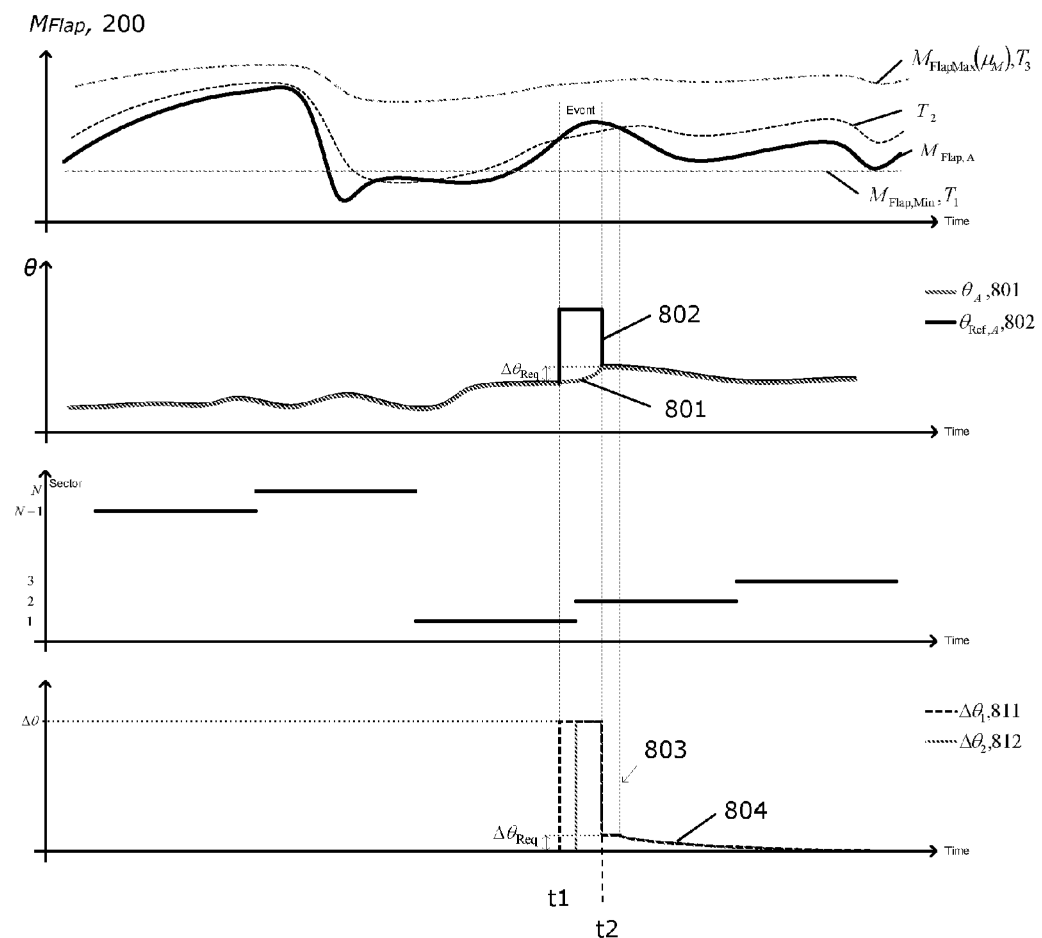
FIG. 8 illustrates the determination of an individual blade pitch contribution for a blade based upon the sector based control method.

FIG. 8 illustrates how the pitch of the individual blades may be updated according to the proposed control method. A time sample of measured blade loads $M_{Flap}$ for the rotor blade A is shown in the uppermost coordinate system along with the values of the thresholds; the absolute minimum threshold $T_1$, the maximum threshold $T_3$, and the threshold $T_2$ being a function of the mean blade load and standard deviation. The second set of curves from the top show the actual blade pitch θ as continuously measured for blade A, 801, and the pitch reference $\theta_{ref,A}=\theta_{col}\Delta\theta$, 802. The curve segments in the third coordinate system show which rotor sector the rotor blade A is in, and the lowermost curves illustrate the determined individual pitch contributions relating to the affected sectors 1 and 2 (811 and 812, respectively) to be added to the blade pitch of the blades passing through these sectors. Advantageously only the required event pitch contribution to keep the flap moment in control can be stored for each sector.

As indicated in the FIG. 8 an event pitch contribution step of Δθ is added to the collective pitch reference when the event is detected at time t1. When the load is in control again (at time t2) the detection stops, and the required pitch contribution is held constant at the pitch value $\theta_{req}$ until the load drops below the flap moment threshold. This required pitch contribution may be determined as the amount of pitch contribution given the blade at the time the blade load is in control. When the load drops below the flap moment threshold 803, the pitch contribution may be decreased 804 e.g. exponentially or linearly over time.

Figure 9:
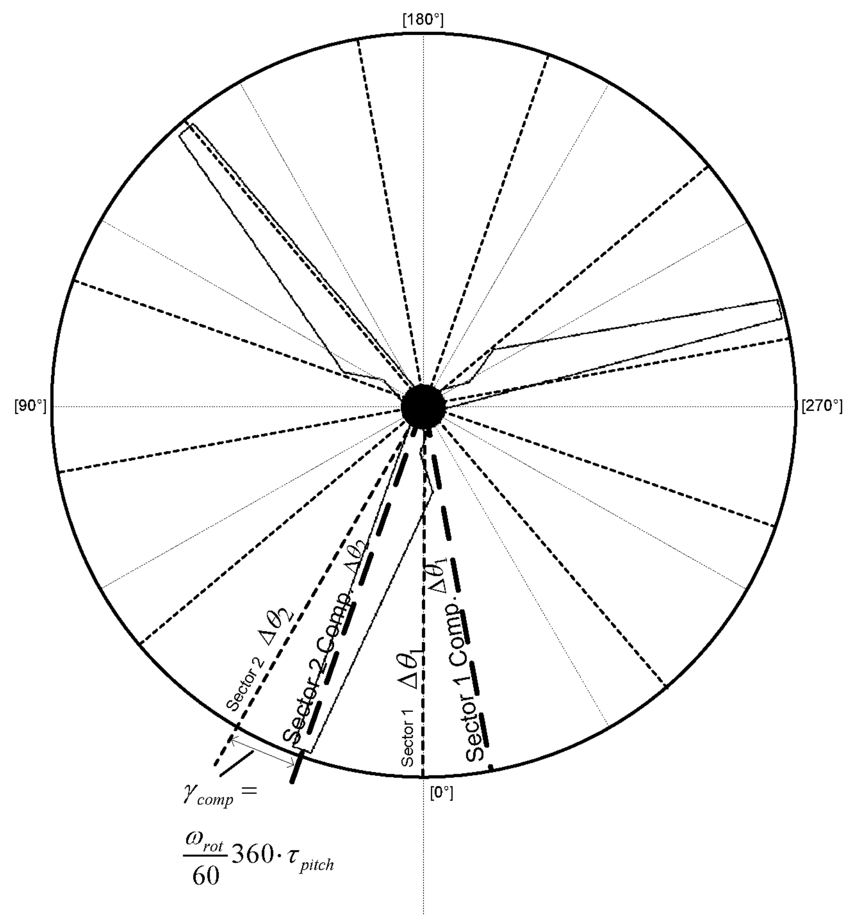
FIG. 9 illustrates the concept of the pitch system delay.

In order to correct for the dynamics of the pitch system, a pitch system delay compensation may according to an embodiment of the invention be implemented. The concept of this is illustrated in FIG. 9. This concept is beneficial for the lagging blades; i.e. if a blade A detects an event and store a required pitch contribution for a certain sector such as sector 3 as illustrated in the figure, then the lagging blade C could advantageously start its pitch sequence prior to entering this sector 3. Hereby the successive extreme loads may be reduced somewhat. In FIG. 9 the pitch system delay compensation is denoted by $\tau_{pitch}$, which is a parameter depending on the pitch actuation system, $\omega_{rot}$ is the rotational speed of the rotor, and $\gamma_{comp}$ is the corresponding compensation angle.

Figure 10:
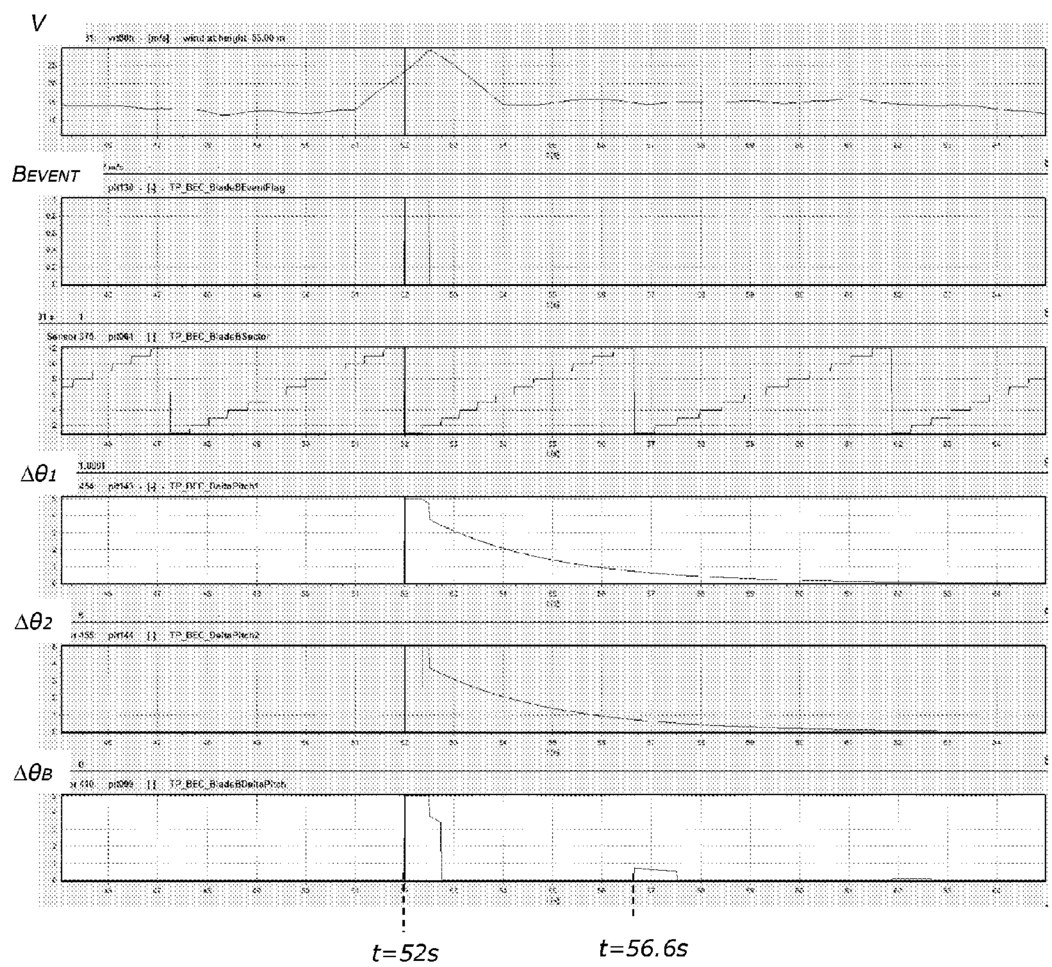
FIG. 10 shows the incoming wind speed, the event flag for one of the blades, and the resulting pitch contribution for two rotor sections and as applied to a blade, the data resulting from a test simulation as a function of time.

FIG. 10 shows the results of a test simulation of the pitch control method according to an embodiment of the invention. In the figure is shown from the top and down, the incoming wind speed V, the event flag for one of the blades (B in this case) indicating that a event is detected in this sector at the time t=52 s, and a variable determining which sector contains the blade B. As may be seen from this curve, the event is detected when sector number 1 contains the blade B and the event is finished for the blade being in sector 2. The two following curves show the resulting pitch contribution for the two affected rotor sections 1 and 2 and the lowermost curve then shows the event pitch contribution for the blade B being affected when it first passes through sections 1 and 2 where the event is detected, and then successively when the blade returns to the same sections one revolution later at time t=56.6, however to a far less degree.

FIG. 11 illustrates the determination of a sector pitch contribution according to an embodiment of the invention by the smoothing of neighbouring sectors pitch contributions.

In general, the boundaries between the different rotor sectors can be either hard or smooth. That is, when a blade switches from one sector to another, the rotor-sector pitch contribution can change from zero to a somewhat large value or the other way around (as illustrated by the curve 1102), which might not always be optimal in relation to the load reduction or loading of the pitch system.

According to this embodiment, the rotor-sector pitch contributions are smoothed across the sectors in order to obtain a bump less transfer of the pitch across sectors. The sector smoothing can be done by e.g. interpolation between neighbouring sector pitch reference contributions. This is illustrated in FIG. 11 with a linear interpolation between the four sectors using the centre of the sectors as interpolation points resulting in the linearly varying pitch contribution shown by the thick line 1100. The x-axis is the blade azimuth angle $\phi$ and the y-axis is rotor-sector pitch contribution $\Delta\theta$. The interpolation may alternatively be of a higher order.

The individual pitch contribution should be reduced to zero in an intelligent way when the wind event has disappeared. As previously mentioned this may be done very simple by setting the pitch reference contribution for a given sector to zero when the blade load is below the sector load threshold. This, however, may unintentionally in some situations cause the blade to pitch into the wind momentarily after an event.

Figure 12:
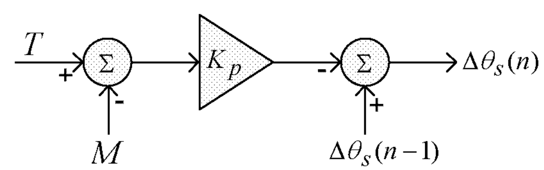
FIG. 12 illustrates a method of adapting the sector pitch contribution to the actual blade data as measured.

In FIG. 12 is illustrated a block diagram of a control scheme according to an embodiment of the invention where the individual pitch contribution $\Delta\theta_s$ (n) for a rotor sector s at time step n is updated and determined as a function of the pitch contribution for the same sector s but for an earlier time step (n−1) $\Delta\theta_s$(n−1). This update or correction of the pitch reference is performed by continuously by comparing the measured blade sensor data such as blade load M with the expected blade sensor data based on information from the last blade in that sector. In the figure this is illustrated by comparison of the measured blade load M with the sector load threshold T. A P-controller is applied where the error signal is defined by the difference between the sector load threshold T and the actual blade load M. The reduction of the sector pitch reference contribution is then found by multiplying the error signal by the proportional gain factor. Finally, the resulting pitch reference contribution is found by subtracting the sector pitch reference contribution reduction from the current sector pitch reference contribution. Alternatively or additionally a PI-, or PID-controller may be applied.

In this way the sector pitch reference contribution reduction rate will be high if the difference between the sector load threshold and the actual blade load is large and low if the difference is low. Hereby, may be obtained a more gradual reduction of the blade sector pitch contribution based on the physical and actual circumstances. While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention claimed is:

1. A method of controlling a wind turbine, the wind turbine comprising a plurality of blades attached to a rotor hub for rotation in a rotor plane and a control system for individually pitching each blade of the plurality of blades relative to the rotor hub, the method comprising:

dividing the rotor plane into a plurality of sectors;

determining, during the rotation of the plurality of blades, which sector of the plurality of sectors corresponds to each blade of the plurality of blades, wherein determining which sector corresponds to each blade is performed by means of an azimuth angle sensor;

obtaining, during the rotation of the plurality of blades, first blade sensor data from a blade sensor on a first blade of the plurality of blades during a first passage of the first blade through a first sector of the plurality of sectors, the blade sensor comprising a blade load sensor and the first blade sensor data comprising first blade load data;

comparing the first blade sensor data with second blade sensor data corresponding to the first blade or to a second blade of the plurality of blades, the second blade sensor data obtained during a second passage of the first blade or the second blade through the first sector during the rotation of the plurality of blades, the second blade sensor data comprising second blade load data;

calculating, based on the first blade sensor data for each sector of the plurality of sectors, a deviation from a defined normal operating condition, wherein the first blade sensor data compromises instantaneous blade sensor data, and wherein calculating a deviation from a defined normal operating condition comprises:

comparing the instantaneous blade sensor data relating to the first sector to a load threshold, the load threshold being a function of mean blade sensor data and a number of standard deviations;

detecting, based on the comparison of the first blade load data and the second blade load data, whether a predefined wind event has occurred within the first sector, wherein detecting whether the predefined wind event has occurred within the first sector is further based on the calculated deviation;

determining, upon detecting the predefined wind event within the first sector, an individual pitch contribution to be applied to each blade of the plurality of blades during a respective passage of each blade through the first sector; and pitching each blade of the plurality of blades according to the determined individual pitch contribution during the respective passage of each blade through the first sector.

2. The method of controlling a wind turbine according to claim 1, wherein the blade sensor comprises a blade stall sensor, wherein the first blade sensor data comprises blade stall data from the blade stall sensor.

3. The method of controlling a wind turbine according to claim 1, further comprising:

detecting a spatial orientation of the wind turbine, wherein the first blade sensor data comprises instantaneous blade sensor data relating to the first sector, wherein detecting whether a predefined wind event has occurred comprises comparing the instantaneous blade sensor data to a load threshold, and wherein the load threshold is a function of the spatial orientation.

4. The method of controlling a wind turbine according to claim 1, wherein calculating a deviation from a defined normal operating condition comprises determining an instantaneous blade load, wherein the method further comprises:

reducing a first load threshold of a first sector by a factor, when the instantaneous blade load exceeds the load threshold in a second sector of the plurality of sectors, the second sector being less than a predefined number of sectors of the plurality of sectors away from said first sector.

5. The method of controlling a wind turbine according to claim 1, wherein detecting whether a predefined wind event has occurred comprises:

comparing an instantaneous blade load relating to the first sector to a maximum load threshold reflecting a predetermined maximally acceptable blade load.

6. The method of controlling a wind turbine according to claim 5, wherein detecting whether a predefined wind event has occurred further comprises:

comparing an instantaneous kinetic energy derived from the instantaneous blade load relating to the first sector to a kinetic energy threshold, the kinetic energy threshold being a function of a mean blade kinetic energy and a number of standard deviations.

7. The method of controlling a wind turbine according to claim 1, wherein detecting whether a predefined wind event further has occurred comprises determining an instantaneous blade load, and wherein each blade of the plurality of blades is pitched according to the determined individual pitch contribution during the respective passage of each blade through the first sector until the instantaneous blade load relating to the first sector is decreasing.

8. The method of controlling a wind turbine according to claim 1, wherein detecting whether a predefined wind event further comprises determining an instantaneous blade load, and wherein each blade of the plurality of blades is pitched according to the determined individual pitch contribution during the respective passage of each blade through the first sector until the instantaneous blade load relating to the first sector is decreased by a load factor, the load factor based on a maximum blade load obtained after detecting the predefined wind event.

9. The method of controlling a wind turbine according to claim 1, wherein the individual pitch contribution is a function of a rotational speed of a rotor of the wind turbine.

10. The method of controlling a wind turbine according to claim 1, where the control system is configured to initiate individually pitching each blade at an angular compensation distance prior to the blade entering the first sector.

11. The method of controlling a wind turbine according to claim 1, wherein the individual pitch contribution is determined as a function of a position of the first blade within the first sector.

12. The method of controlling a wind turbine according to claim 1, wherein the control system comprises a memory adapted for blade sensor data comprising the first blade sensor data and the second blade sensor data, and wherein the method further comprises:

determining, using the blade sensor data corresponding to sensors on a leading blade of the plurality of blades, a required pitch contribution of a lagging blade of the plurality of blades.

13. The method of controlling a wind turbine according to claim 1, wherein the individual pitch contribution is determined as a function of a gradient of the first blade sensor data and the second blade sensor data.

14. The method of controlling a wind turbine according to claim 1, wherein the individual pitch contribution is adjusted as a function of a difference between a load threshold for the first sector and a measured blade load.

15. The method of controlling a wind turbine according to claim 1, wherein each sector of the plurality of sectors is between 5 degrees and 30 degrees.

16. The method of controlling a wind turbine according to claim 1, wherein each sector of the plurality of sectors has an equal size.

17. A wind turbine comprising:

a plurality of blades attached to a rotor hub for rotation in a rotor plane;

a control system for individually pitching each blade of the plurality of blades relative to the rotor hub, wherein the control system is configured to:

determine, during the rotation of the plurality of blades, which sector of a plurality of sectors of the rotor plane corresponds to each blade of the plurality of blades, wherein determining which sector corresponds to each blade is determined by means of an azimuth angle sensor, obtain, during the rotation of the plurality of blades, first blade sensor data from a blade sensor on a first blade of the plurality of blades during a first passage of the first blade through a first sector of the plurality of sectors, the blade sensor comprising a blade load sensor and the first blade sensor data comprising first blade load data, compare the first blade sensor data with second blade sensor data corresponding to the first blade or to a second blade of the plurality of blades, the second blade sensor data obtained during a second passage of the first blade or the second blade through the first sector during the rotation of the plurality of blades, the second blade sensor data comprising second blade load data, calculate, based on the first blade sensor data for each sector of the plurality of sectors, a deviation from a defined normal operating condition, wherein the first blade sensor data comprises instantaneous blade sensor data, and wherein calculating a deviation from a defined normal operating condition comprises:

comparing the instantaneous blade sensor data relating to the first sector to a load threshold, the load threshold being a function of mean blade sensor data and a number of standard deviations;

detect, based on the comparison of the first blade load data and the second blade load data, whether a predefined wind event has occurred within the first sector, wherein detecting whether the predefined wind event has occurred within the first sector is further based on the calculated deviation, and determine, upon detecting the predefined wind event within the first sector, an individual pitch contribution to be applied to each blade of the plurality of blades during a respective passage of each blade through the first sector, the control system comprising a pitch system configured to pitch each blade of the plurality of blades according to the determined individual pitch contribution during the respective passage of each blade through the first sector.

18. The wind turbine according to claim 17, wherein the control system further comprises a memory configured to:

store data from one or more load sensors on a leading blade of the plurality of blades, wherein the control system is further configured to determine, based on the stored data, the individual pitch contribution for a lagging blade of the plurality of blades.

19. The wind turbine according to claim 17, wherein each blade of the plurality of blades comprises a respective blade load sensor, each blade load sensor arranged at a same distance from the rotor hub.

20. The wind turbine according to claim 17, wherein each blade of the plurality of blades comprises a plurality of blade sensors arranged at different distances from the hub, thereby defining a plurality of sub-sectors within each sector of the plurality of sectors, wherein the control system is further configured to detect whether a predefined wind event has occurred within a sub-sector of the plurality of sub-sectors.

21. A control system for individually pitching each blade of a plurality of blades relative to a rotor hub of a wind turbine, the plurality of blades being attached to the rotor hub for rotation in a rotor plane, the control system comprising one or more computer processors configured to:

determine, during the rotation of the plurality of blades, which sector of a plurality of sectors of the rotor plane corresponds to each blade of the plurality of blades, wherein determining which sector corresponds to each blade is determined by means of an azimuth angle sensor, obtain, during the rotation of the plurality of blades, first blade sensor data from a blade sensor on a first blade of the plurality of blades during a first passage of the first blade through a first sector of the plurality of sectors, the blade sensor comprising a blade load sensor and the first blade sensor data comprising first blade load data, compare the first blade sensor data with second blade sensor data corresponding to the first blade or to a second blade of the plurality of blades, the second blade sensor data obtained during a second passage of the first blade or the second blade through the first sector during the rotation of the plurality of blades, the second blade sensor data comprising second blade load data, calculate, based on the first blade sensor data for each sector of the plurality of sectors, a deviation from a defined normal operating condition, wherein the first blade sensor data comprises instantaneous blade sensor data, and wherein calculating a deviation from a defined normal operating condition comprises:

comparing the instantaneous blade sensor data relating to the first sector to a load threshold, the load threshold being a function of mean blade sensor data and a number of standard deviations;

detect, based on the comparison of the first blade load data and the second blade load data, whether a predefined wind event has occurred within the first sector, wherein detecting whether the predefined wind event has occurred within the first sector is further based on the calculated deviation, and determine, upon detecting the predefined wind event within the first sector, an individual pitch contribution to be applied to each blade of the plurality of blades during a respective passage of each blade through the first sector, and set a blade pitch command according to the determined individual pitch contribution during the respective passage of each blade through the first sector.

22. The method of claim 1, wherein pitching each blade of the plurality of blades according to the individual pitch contribution is performed within a duration of the detected predefined wind event.

23. The method of claim 22, further comprising:

detecting, based on third blade sensor data obtained after detecting the predefined wind event within the first sector, an end of the predefined wind event; and reducing the individual pitch contribution to zero.

* * * * *